United States Patent
Dolan et al.

(10) Patent No.: US 6,396,820 B1
(45) Date of Patent: *May 28, 2002

(54) WIRELESS TELECOMMUNICATIONS SYSTEM FOR IMPROVING PERFORMANCE AND COMPATIBILITY

(75) Inventors: Michael Francis Dolan, Bolingbrook; Thomas Lee McRoberts, Naperville, both of IL (US); Eshwar Pittampalli, Randolph, NJ (US); Thomas Trayer Towle, Naperville, IL (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/881,192

(22) Filed: Jun. 24, 1997

(51) Int. Cl.[7] .............................. H04Q 7/00; H04Q 7/20
(52) U.S. Cl. ...................... 370/328; 370/328; 370/331; 455/436; 455/442
(58) Field of Search .................................. 370/329, 338, 370/341, 349, 465, 466, 352, 467, 331, 401, 328, 342, 332–333; 455/560, 553, 445, 436, 439, 426, 442

(56) References Cited

U.S. PATENT DOCUMENTS

| | | | |
|---|---|---|---|
| 5,195,090 A | | 3/1993 | Bolliger et al. ............ 379/94.1 |
| 5,212,684 A | * | 5/1993 | MacNamee et al. .......... 370/24 |
| 5,268,933 A | * | 12/1993 | Averbuch .................... 370/349 |
| 5,278,892 A | | 1/1994 | Bolliger et al. ................ 379/60 |
| 5,383,187 A | | 1/1995 | Vardaka et al. ............. 370/94.3 |
| 5,438,565 A | | 8/1995 | Hemmady et al. ............. 370/60 |
| 5,548,586 A | * | 8/1996 | Kito et al. .................... 370/349 |
| 5,550,816 A | | 8/1996 | Hardwick et al. ............. 370/60 |
| 5,561,852 A | * | 10/1996 | Heeschen et al. .......... 455/54.1 |
| 5,570,367 A | * | 10/1996 | Ayanoglu et al. ........... 370/349 |
| 5,590,126 A | * | 12/1996 | Mishra et al. ................ 370/329 |
| 5,608,780 A | * | 3/1997 | Gerszberg et al. .......... 370/338 |
| 5,640,391 A | * | 6/1997 | Nitta et al. .................. 370/341 |
| 5,729,536 A | * | 3/1998 | Doshi et al. ................. 370/328 |
| 5,831,976 A | * | 11/1998 | Lin et al. ..................... 370/329 |
| 5,845,215 A | * | 12/1998 | Henry et al. ................. 455/553 |
| 5,889,954 A | * | 3/1999 | Gessel et al. ................ 370/467 |
| 5,918,181 A | * | 6/1999 | Foster et al. ................. 455/456 |
| 5,930,714 A | * | 7/1999 | Abu-Amara et al. ......... 455/442 |
| 5,949,773 A | * | 9/1999 | Bhalla et al. ................ 370/331 |
| 5,956,645 A | * | 9/1999 | Harper et al. ................ 455/466 |
| 5,978,386 A | * | 11/1999 | Hamalainen et al. ....... 370/466 |
| 6,018,521 A | * | 1/2000 | Timbs et al. ................. 370/342 |

FOREIGN PATENT DOCUMENTS

| | | | |
|---|---|---|---|
| EP | 0 578 260 B1 | 10/1999 | |
| WO | WO 9510150 | 8/1995 | ........... H04L/12/28 |

* cited by examiner

*Primary Examiner*—Ajit Patel
*Assistant Examiner*—Hanh Nguyen (57) ABSTRACT

Service provider flexibility in wireless network configuration is enhanced by first and second interconnection protocols which enable flexibility in mobile switching center/base station communications. This communication flexibility allows service providers to control, on a call-by-call basis, the operation of the wireless telecommunications network.

5 Claims, 10 Drawing Sheets

WIRELESS TELECOMMUNICATIONS SYSTEM FOR IMPROVING PERFORMANCE AND COMPATIBILITY

CROSS REFERENCE TO RELATED APPLICATION

This application is related to the applications of:

Deborah L. Barclay, Michael F. Dolan, Thomas L. McRoberts, Larry E. Pelletier, Albert J. Sawyer and Joseph E. Seitz entitled "Method For Source Transfer In A Wireless Telecommunications System";

Deborah L. Barclay, Michael F. Dolan, Thomas L. McRoberts and Thomas T. Towle entitled "Method For Handoff Type Selection By A Target Base Station In A Wireless Telecommunications System"; and Michael F. Dolan and Thomas T. Towle entitled "Method For Addressing Call Glare In Wireless Telecommunications Systems" which applications are assigned to the assignee of the present application, and are being filed concurrently herewith.

TECHNICAL FIELD

This invention relates to wireless telecommunications networks, and more particularly, to enhancing the compatibility and performance of systems which comprise such wireless telecommunications networks.

BACKGROUND OF THE INVENTION

The world-wide proliferation of wireless telecommunications presents an opportunity for service providers positioned to benefit from an, ever-growing demand for convenient, reliable wireless service. As these service providers are well aware, controlling expenses while providing such service, via the procurement and maintenance of state-of-the-art wireless telecommunications equipment, poses a significant challenge. Existing wireless service providers meet this challenge by implementing wireless telecommunications networks comprised of mobile switching centers (MSCs) interconnected to base stations. The MSC completes calls between mobile stations (that is, any mobile terminal using radio transmission) and other parties. These "other parties" may be mobile stations or parties served by the public-switched telephone network. Each base station is associated with a specific geographic region and is an interface between mobile stations within its region and the MSC.

It is common for the MSC and base stations to use circuit switched technology for transmitting signals and user traffic. Although highly reliable, circuit switched interconnections require large numbers of port interfaces and are often incompatible with new, more efficient technologies, such as code division multiple access (CDMA) which is characterized by multiple signaling and user traffic channels per call. Many wireless service providers retain older equipment and elect not to upgrade their networks with new technology due to this incompatibility. Unfortunately, rapid advances in wireless technology mean that these service providers are often left with obsolete equipment.

Another problem associated with existing wireless telecommunications equipment is the severe limitation it places on the ability of service providers to devise varied network configurations. This is because telecommunication equipment vendors use rigid interconnection protocols and routinely dispose integral functions in a number of systems which must be accessed each time a call is processed. As a result, it is impossible to choose and allocate, on a call-by-call basis, individual network components for supporting a call. Indeed, service providers cannot create, either call-by-call or network-wide, a multi-vendor, customized wireless telecommunications network for exploiting a synergy or minimizing problems associated with providing wireless service in a particular geographic area. Restraining use of wireless telecommunications equipment raises the cost of doing business for all wireless service providers. These costs and inconveniences associated with maintaining outdated telecommunications equipment are ultimately borne by wireless service subscribers.

Therefore, there is a need in the art for enhancing the compatibility and performance of wireless telecommunications equipment deployed in wireless telecommunications networks.

SUMMARY OF THE INVENTION

This need is addressed and a technological advance is achieved by interconnection protocols for supporting packet switched messages between the MSC and base stations in wireless telecommunications systems. More particularly, a first packet interconnection protocol establishes an interface between a selection distribution unit (SDU) for performing frame selection and voice transcoding, and a base station interconnection processor for transmitting control information, signaling and user traffic to mobile stations. A second packet interconnection protocol establishes an interface between the SDU and a base station controller for transmitting control information. By using packet-based technologies for the exchange of data between SDUs base stations, MSCs and base station can be interconnected in a variety of configurations to support individual wireless network requirements. Further, since MSCs and base stations can be interconnected via a single port packet interface per component (e.g., the SDU), multiple port interfaces, as required with circuit switched technology, are optional.

The network configuration flexibility enabled by the packet interconnection protocols is manifested in the service provider's freedom to position systems in a variety of locations within a wireless network. New and varied network configurations enable advantages arising from the centralization of existing functions such as call processing, hand-offs and base station to base station communications. Further, the location flexibility enabled by the packet interconnection protocols allows wireless service providers to use multi-vendor equipment for creating a wireless network customized to meet specific standards of quality and cost efficiency.

DETAILED DESCRIPTION

FIGS. 1–4 are illustrative embodiments of wireless telecommunications systems in which the present invention may be practiced. Although four embodiments are shown for clarity, those skilled in the art will recognize that the first and second packet interconnection protocols may enable numerous other arrangements of wireless telecommunications systems.

Figure 1:
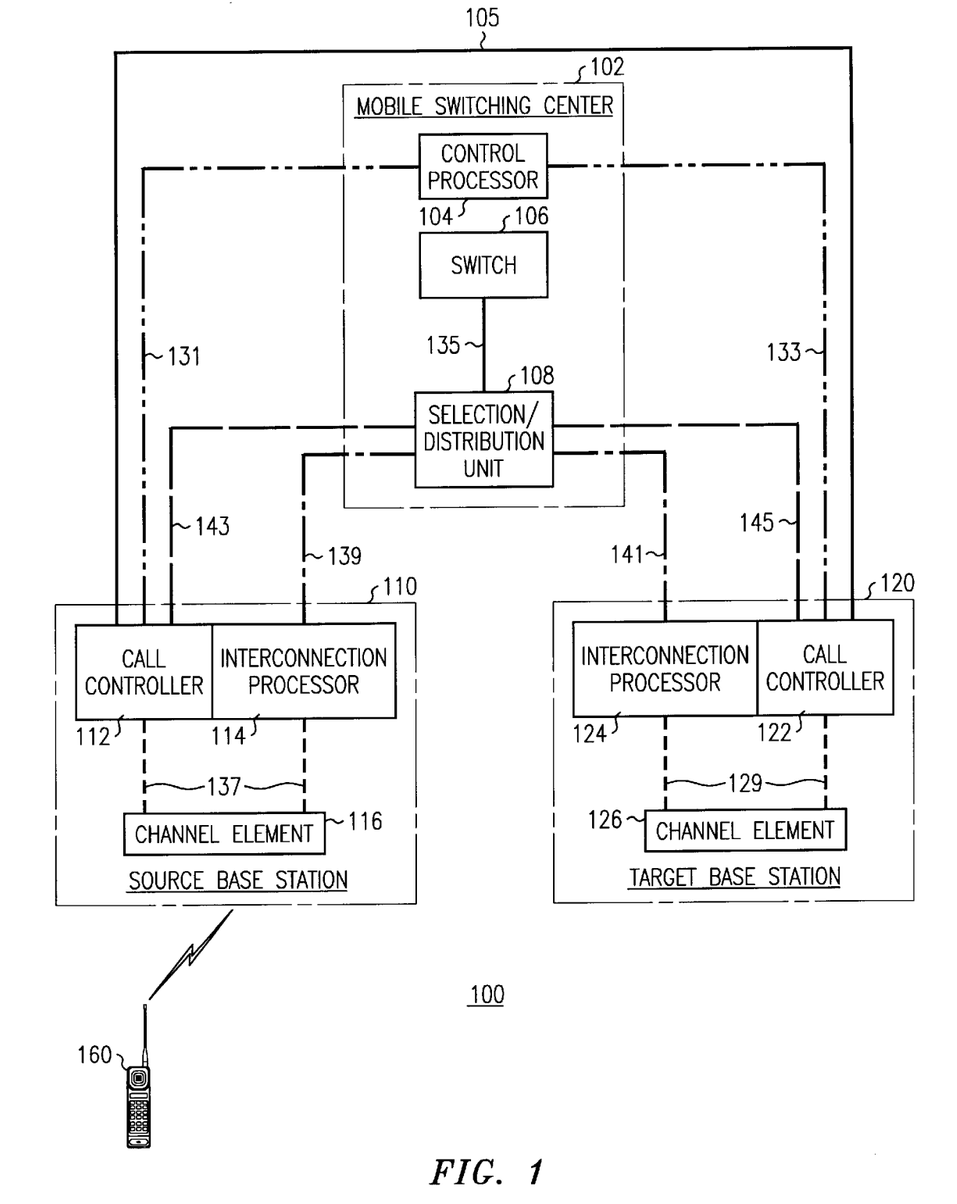
FIGS. 1–4 are illustrative embodiments of wireless telecommunications systems in which the present invention may be practiced.

FIG. 1 is a simplified block diagram of wireless telecommunications system 100 including mobile switching center (MSC) 102, first base station 110 and second base station 120. MSC 102 includes control processor 104 for executing tasks associated with call control and mobile station mobility management. Control processor 104 is interconnected to call control processors of the first and second base stations via signaling links 131 and 133, respectively. In alternative embodiments, signaling links 131 and 133 resources are conserved by multiplexing into a common channel for accessing control processor 104 of MSC 102. Switch fabric 106 is interconnected to SDU 108 via user traffic (voice/data) link 135. In this embodiment, SDU 108 provides frame selection and voice coding for all base stations in wireless network 100 (in this example, base stations 110 and 120).

First base station 110 comprises call control processor 112 for administering functions associated with call origination and termination, and controlling SDU 108 on a call-by-call basis; interconnection processor 114 for mapping proprietary connections 137 into the standard user traffic interface 139 to the SDU; and channel element 116 for establishing communications between the base station and subscriber equipment, such as mobile station 160. Call control processor 112 and interconnection processor 114 communicate with channel element 116 over proprietary interfaces 137, as known in the art. SDU 108 is interconnected to interconnection processor 114 via a first packet-interconnection protocol over packet transport-based link 139. SDU 108 is also interconnected to call control processor 112 via a second packet interconnection protocol over packet transport-based link 143 for allowing first base station 110 to control SDU 108, as necessary.

Similarly, second base station 120 comprises call control processor 122, interconnection processor 124 and channel element 126. Call control processor 122 and interconnection processor 124 communicate with channel element 126 over proprietary interfaces 129. Interconnection processor 124 is interconnected to SDU 108 via a first packet interconnection protocol over packet transport-based link 141 and call control processor 122 is interconnected to SDU 108 via a second packet interconnection protocol over packet transport-based link 145. Call processor 112 and call control processor 122 communicate directly via signaling link 105.

In this illustrative embodiment, SDU 108 is positioned within MSC 102. The separation of the SDU function from a base station and its centralization enhances the ability of service providers to enhance the efficiency of existing call processing functions as described below.

Figure 2:
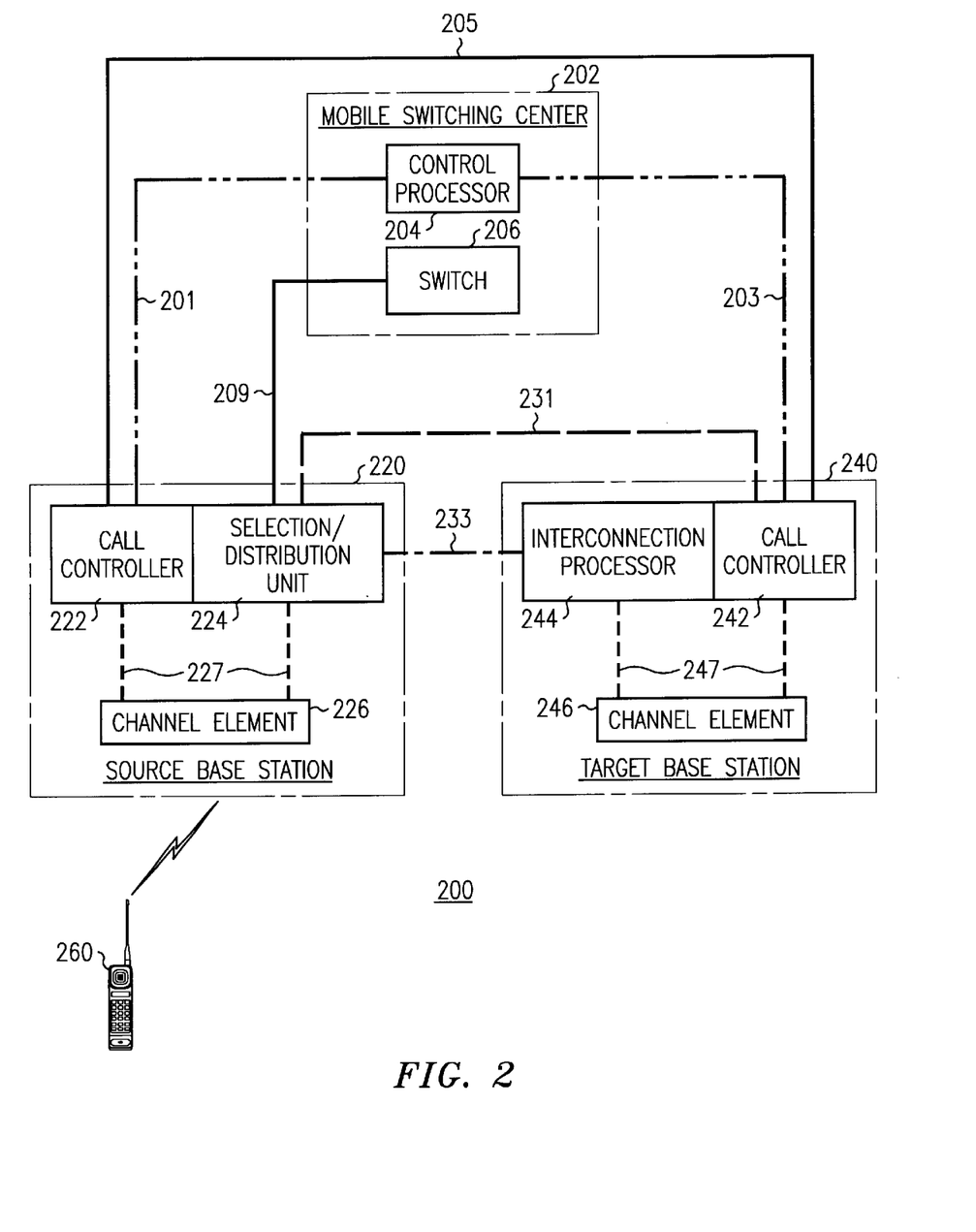

FIG. 2 is a simplified block diagram of wireless telecommunications system 200 including mobile switching center 202, first base station 220 and second base station 240. Also shown is mobile station 260 served by the first base station. Mobile switching center 202 includes call control processor 204 and switch fabric 206. Call control processor 204 is interconnected to call control processors of the first and second base stations via signaling links 201 and 203, respectively. Switch fabric 206 is interconnected to SDU 224 (positioned within the first base station) via user traffic (voice/data) link 209. In this embodiment, SDU 224 provides frame selection and voice coding for all calls initiated or handed off by means of hard handoff to base station 220.

First base station 220 comprises call control processor 222, SDU 224 and channel element 226. Channel element 226 is interconnected to the rest of the components within the base station via proprietary interfaces 227. Second base station 240 comprises call control processor 242 and interconnection processor 244 which are interconnected to channel element 246 via proprietary interfaces 247. In this embodiment, SDU 224 not only serves the first base station but is shown interconnected to call control processor 242 and interconnection processor 244 of the second base station via packet transport-based signaling and user traffic link 233, and packet transport-based signaling link 231, respectively. Signaling link 231 allows SDU 224 to be controlled by other base stations while signaling and user traffic link 233 enables communication of coded voice between a base station (in this case, second base station 240) and an SDU located in a different base station (in this example, first base station 220) on a call by call basis. Although SDU 224 is shown positioned within first base station 220, second base station 240 may include the SDU in alternative embodiments. Further, in alternative embodiments, a common signaling channel is created by multiplexing multiple instances of signaling link 201 into a single interface between base station 220 and call control processor 204 of MSC 202, or multiple instances of signaling link 203 into a single interface between base station 240 and call control processor 204.

Figure 3:
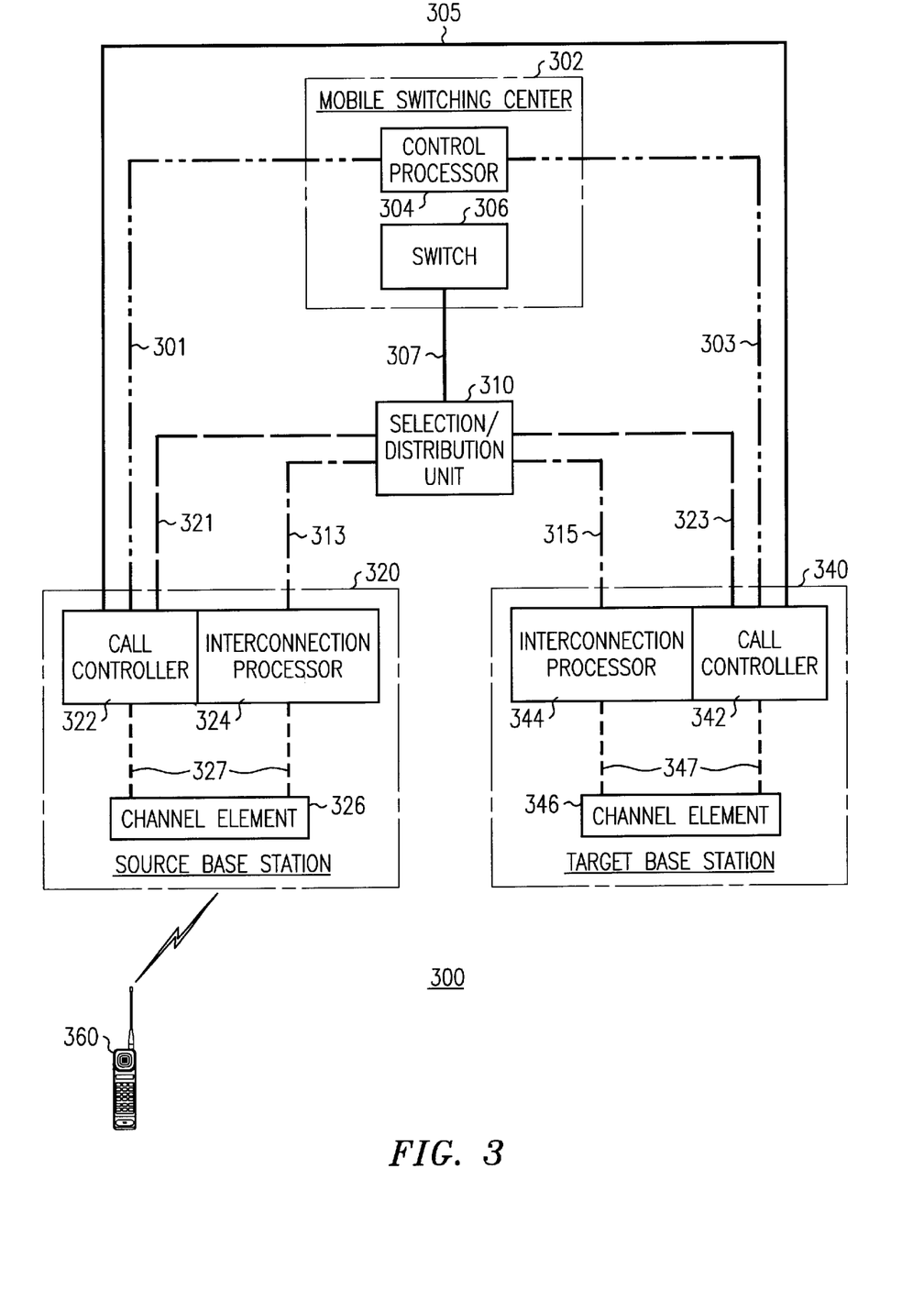

FIG. 3 illustrates a network configuration embodiment in which the SDU function is located independently of both the MSC and base stations. In this embodiment SDU 310 provides frame selection and voice coding for all base stations in wireless network 300 and can be accessed by multiple base stations. More particularly, wireless telecommunications system 300 comprises mobile switching center 302, SDU 310 , first base station 320, and second base station 340.

MSC 302 comprises control processor 304 and switch fabric 306. In this embodiment, control processor 304 is interconnected to first base station 320 and second base station 340 via signaling links 301 and 303, respectively. SDU 310 is interconnected to switch fabric 306 of MSC 302 via user traffic link 307. SDU 310 also maintains packet transport-based user traffic and signaling links 313 and 315 to interconnection processors associated with first base station 320 and second base station, respectively. Packet transport-based signaling links 321 and 323 are subject to the second interconnection protocol and allow first base station 320 and second base station 340, respectively, to control the SDU when necessary as described in detail below.

First base station 320 comprises call control processor 322, interconnection processor 324 and channel element 326. Channel element 326 communicates with other components within the base station over proprietary links 327. In this embodiment, first base station 320 serves mobile station 360. Similarly, second base station 340 comprises control processor 342 and interconnection processor 344 which are connected to channel element 346 via proprietary interfaces 347.

Packet transport-based user traffic and signaling links 313, 315 are subject to the first interconnection protocol and enable the communication of coded voice and associated signaling between the base stations and SDU 310 on a call by call basis. In alternative embodiments, multiple instances of signaling links 301 and 303, respectively, may be multiplexed into common signaling channels to reduce the overall number of signaling links which may be transmitted by the system. Call control processor 322 and call control processor 342 can communicate directly via signaling link 305.

Figure 4:
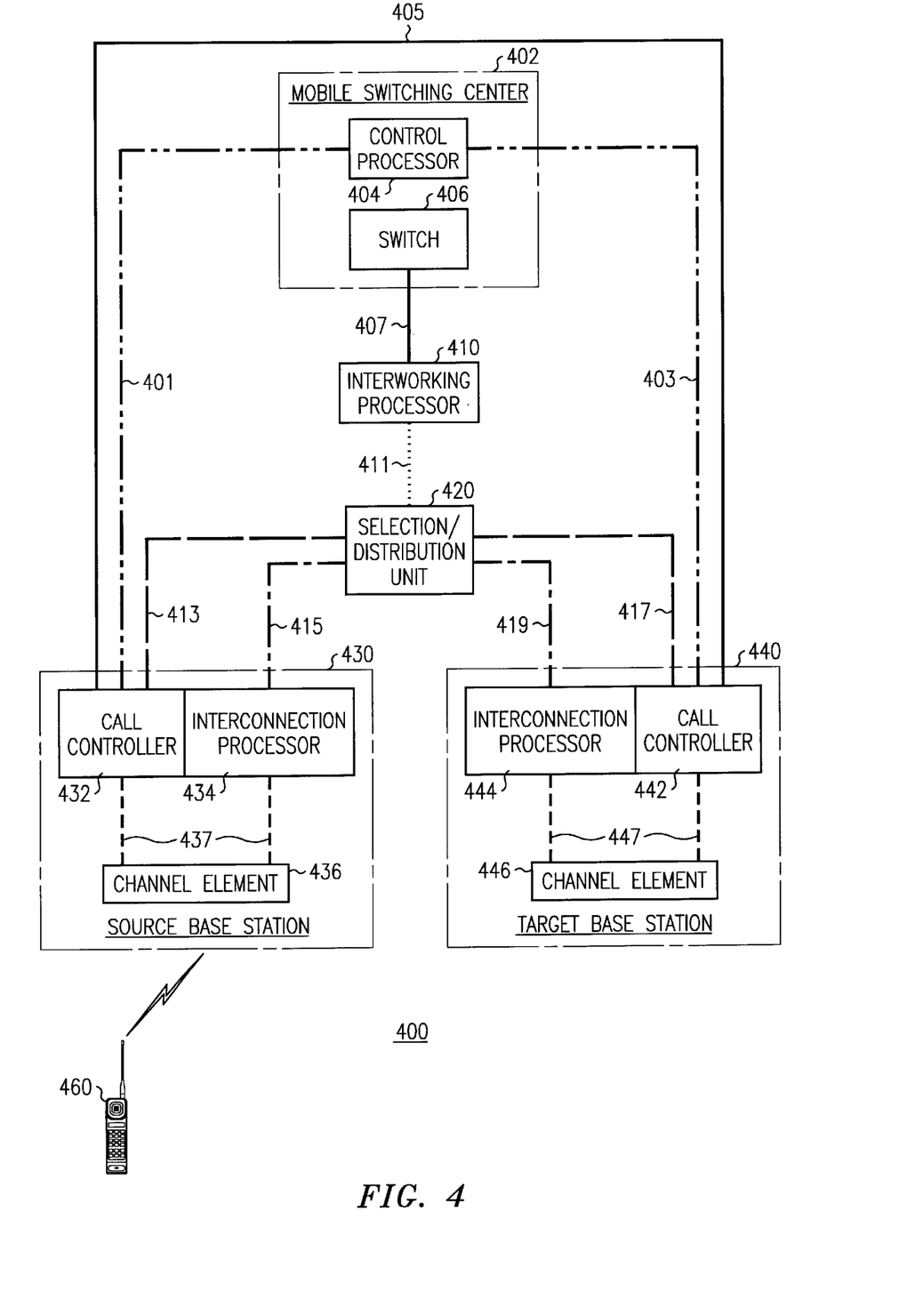

FIG. 4 is a simplified diagram illustrating yet another embodiment of the present invention including an "interworking processor" for performing functions associated with transforming data from a format used within the public switched telephone network to one used across an air interface.

Wireless telecommunications system 400 comprises MSC 402, interworking processor 410, SDU 420, first base station 430 and second base station 440. MSC 402 includes control processor 404 which communicates with the call control processors 432 and 442 of first base station 430 and second base station 440, respectively, via signaling links 403 and 405, respectively. Also shown is switch fabric 406 which is interconnected to interworking processor 410 via user data traffic link 407. In turn, interworking processor 410 is connected to SDU 420 via user data traffic link 411. SDU 420 provides frame selection and termination of the radio link protocol used for data transmission for all base stations in wireless network 400. SDU 420 maintains packet transport-based links to the first and second base stations, as described below.

First base station 430 comprises. call control processor 432 and interconnection processor 434 which communicate with channel element 436 over proprietary interfaces 437. Also shown is mobile station 460 served by the first base station 430. In this embodiment, call control processor 432 is interconnected to SDU 420 via packet transport-based link 413 which is subject to the second interconnection protocol. Interconnection processor 434 is interconnected to SDU 420 via packet transport-based link 415 subject to the first interconnection protocol. Second base station 440 comprises call control processor 442 and interconnection processor 444 which are connected to channel element 446 via proprietary interface 447. Call control processor 442 is interconnected to SDU 420 via packet transport-based signaling link 417 while interconnection processor 444 is connected to the SDU via packet transport-based link 419. Signaling links 413 and 417 allow each base station to control SDU 420 as necessary for various processes including call handoff. Signaling links 415 and 419 enable the communication of coded data and associated signaling between each base station and the SDU on a call by call basis. Call control processor 432 and call control processor 442 can communicate directly via signaling link 405.

The central, and independent location of interworking processor 410 and SDU 420 allows wireless service providers great flexibility in network configuration since the functionality associated with these two processes, can be accessed by a number of base stations. In other words, allocation of the interworking process and the SDU function on a per base station basis is not required. Although interworking processor 410 is shown in a central location, alternative embodiments may deploy the interworking processor in many other locations, such as a base station, MSC or within the SDU.

The above-described illustrative embodiments are presented to exemplify the network configuration flexibility enabled by the first and second packet interconnection protocols for communication between the MSC and base stations vi an SDU. Although the most common implementations of the present invention have been shown, those skilled in the art may devise numerous other arrangements using these packet transport protocols.

Predictably, the first and second packet transport interconnection protocols which enable the location flexibility also affect call processing. To exemplify the impact on existing call processes, a series of message flow diagrams is presented in FIGS. 5–10. For purposes of clarity, each message flow diagram is associated with a wireless telecommunications system depicted in FIGS. 1–4. Although the association with a wireless telecommunications system is made for clarity, those skilled in the art will recognize that these messages may be deployed in any number of wireless network configurations.

Figure 5:
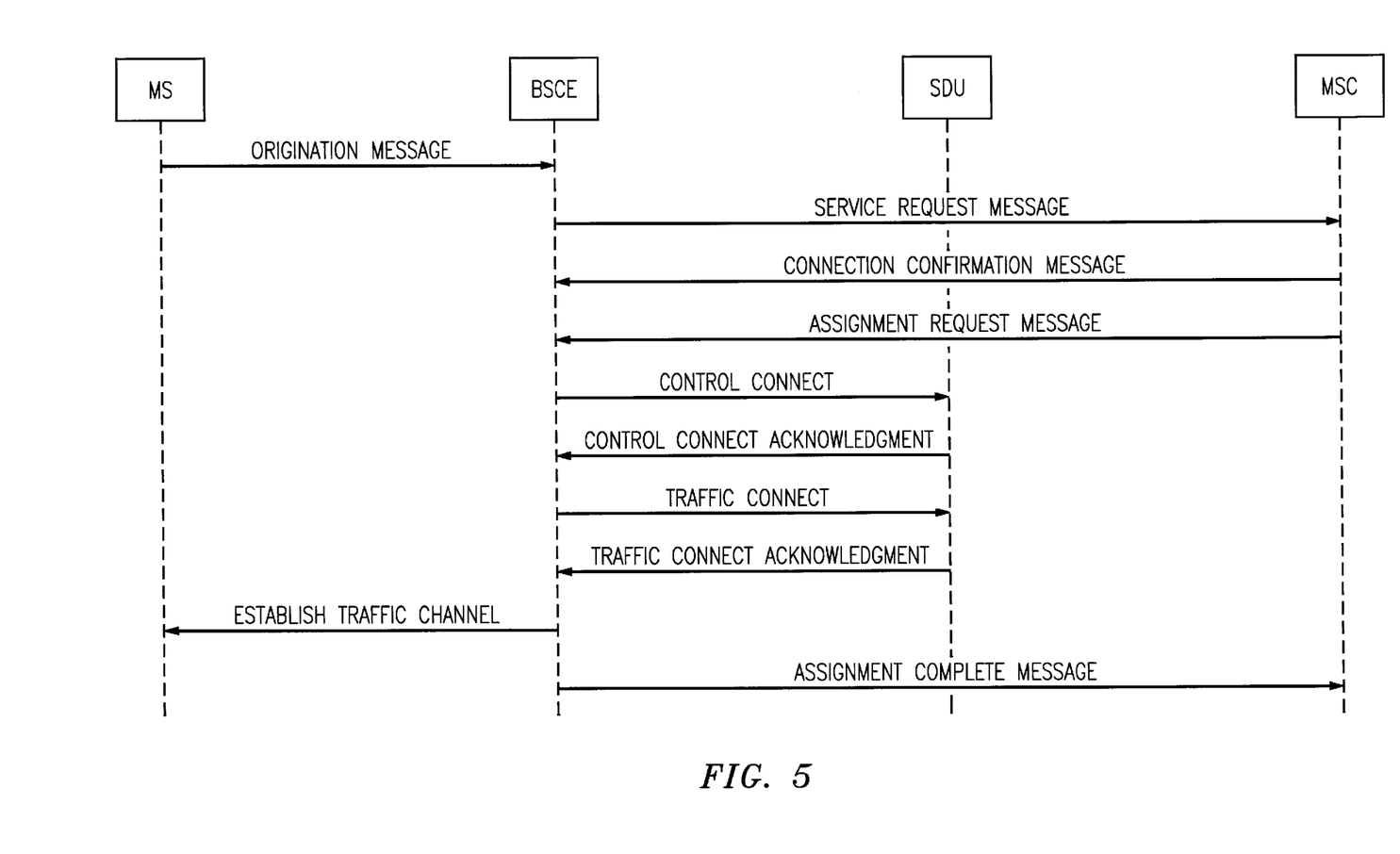
FIG. 5 is a message flow diagram of mobile station call origination as performed in the wireless telecommunications system of FIG. 1.

FIG. 5 is a message flow diagram depicting the exchange of messages required for origination of a call from a mobile station to another party. For purposes of example, assume that the messages described below are exchanged within wireless telecommunications system 100 as shown in FIG. 1. In this example, a user associated with mobile station 160 wishes to place a call to another party (not shown). Accordingly, mobile station 160 transmits an origination message to its serving base station (that is, base station 110). Base station 110 receives the origination message and extends a service request message to MSC 102 over signaling link 131. In response to this service request message, base station 110 receives a connection confirmation message from MSC 102 over signaling link 131. Subsequently, MSC 102 sends an assignment request message to base station 110 over signaling link 131. After base station 110 receives the assignment request message from the mobile switching center over signaling link 131, base station 110 assigns radio resources to the call and initiates a packet transport based channel establishment procedure for signaling between call control processor 112 and SDU 108 over signaling link 143 to allow base station 110 to control SDU 108. Base station 110 also establishes a packet transport based communication link 139 between interconnection processor 114 and SDU 108. Subsequently, base station 110 establishes a traffic channel with mobile station 160 and a call connection is made. Base station 110 extends an assignment complete message to MSC 102 over signaling link 131 to indicate that it considers the call to be in a "conversation state." In the preferred embodiment, the assignment complete message includes a time parameter which indicates a more nearly exact time at which the mobile began to use the traffic channel. Advantageously, this time of origination allows the service provider to more accurately bill for the call.

Figure 6:
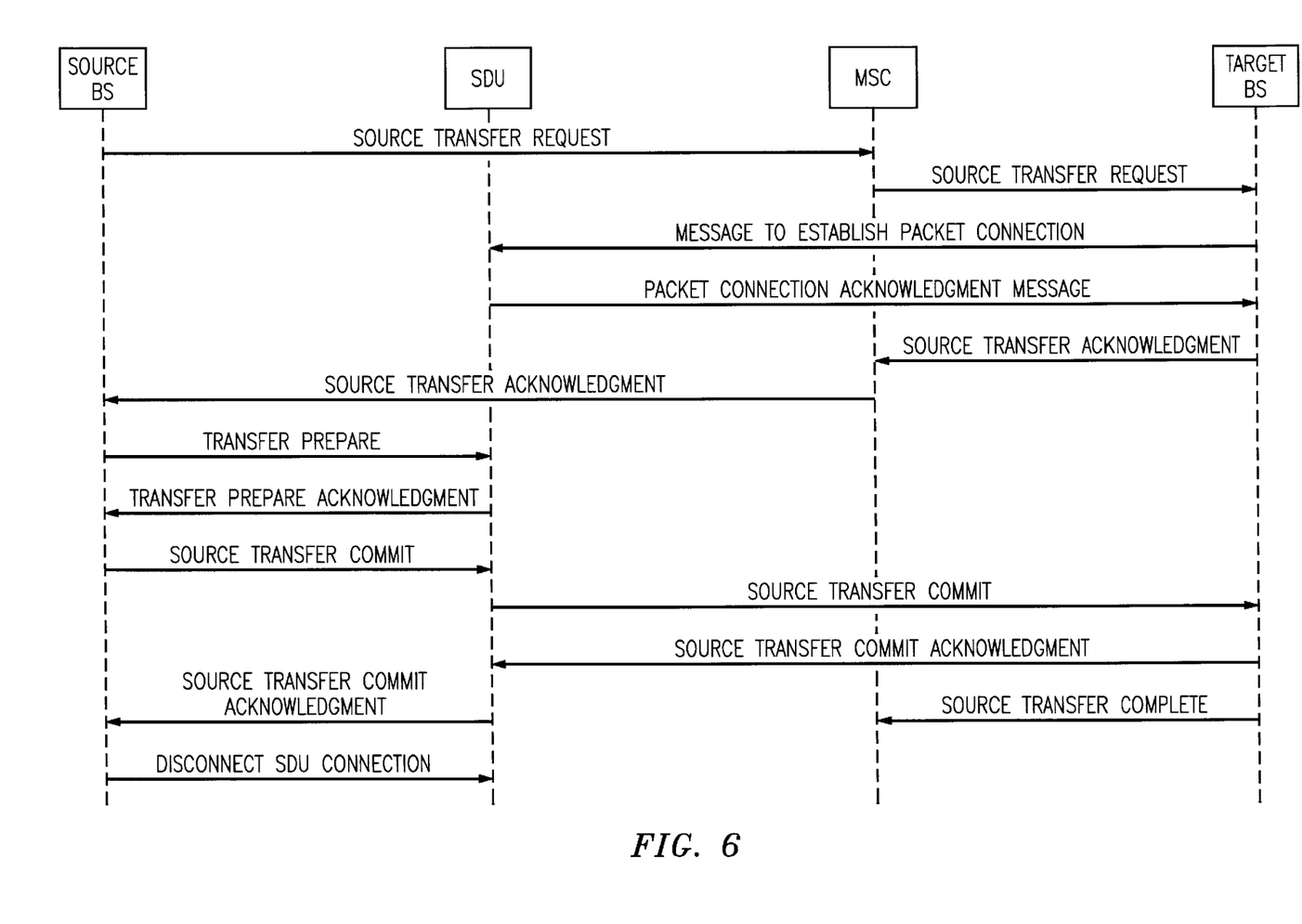
FIG. 6 is a message flow diagram of soft handoff source transfer as performed in the wireless telecommunications system of FIG. 3.

FIG. 6 is a message flow diagram depicting messages exchanged during soft handoff source transfer occurring when a user of a mobile station travels outside of the geographic area of a first base station. For purposes of this example, assume that the mobile station is mobile station 360 served by wireless telecommunications system 300 shown in FIG. 3. Also assume that the mobile station is traveling out of the geographic region served by the first base station 320 (also known as the "source" base station) to the geographic area served by second base station 340 (also known as the "target" base station). Initiation of call control transfer from the source base station to the target base station is commenced when source base station 320 realizes that source transfer is necessary and extends a soft handoff source transfer message to MSC 302 over signaling link 301. MSC 302 receives the soft handoff source transfer message and forwards it to target base station 340 over signaling link 303. The soft handoff source transfer message includes information identifying the call currently served by source base station 320. In this example, assume that target base station 340 determines that it will accept the source transfer (in alternative embodiments, the target base station may decline to accept the source transfer call). Accordingly, target base station 340 extends a packet connection request message to SDU 310 to create signaling link 323 in response to receiving the soft handoff source transfer message from MSC 302. The packet connection request message extended to the SDU includes information which uniquely identifies the call currently served by the source base station. SDU 310 then sends an acknowledgment message to target base station 340. Target base station extends a soft handoff source transfer acknowledgment message to MSC 302 via signaling link 303. Subsequently, MSC 302 forwards the soft handoff source transfer acknowledgment message to source base station 320 over signaling link 301. In alternative embodiments, the soft handoff source transfer message could have been sent directly from the source base station 320 to the target base station 340 across signaling link 305. The soft handoff source transfer acknowledgment message could also have been sent across signaling link 305. Upon receipt of the soft handoff transfer acknowledgment message, source base station 320 extends a transfer prepare message to SDU 310 over link 313. SDU 310 responds with a transfer prepare acknowledgment message to source base station 320 indicating its readiness for source transfer. Upon receipt of the transfer prepare acknowledgment message, base station 320 sends a source transfer commit message across signaling link 321 to SDU 310 to cause the transfer of call control. SDU 310 forwards the source transfer commit message to target base station 340 over signaling link 323. Target base station 340 then responds to the SDU with a source transfer commit acknowledgment message indicating that it now has control of SDU 310. SDU 310 forwards the source transfer commit acknowledgment message to base station 320 across signaling link 321. Next, target base station 340 sends a soft handoff source transfer complete message to MSC 302 via signaling link 303. This message notifies the MSC that base station 340 now has control of the call which was previously served by base station 320. Base station 320 then disconnects its connection 321 with SDU 310.

Figure 7:
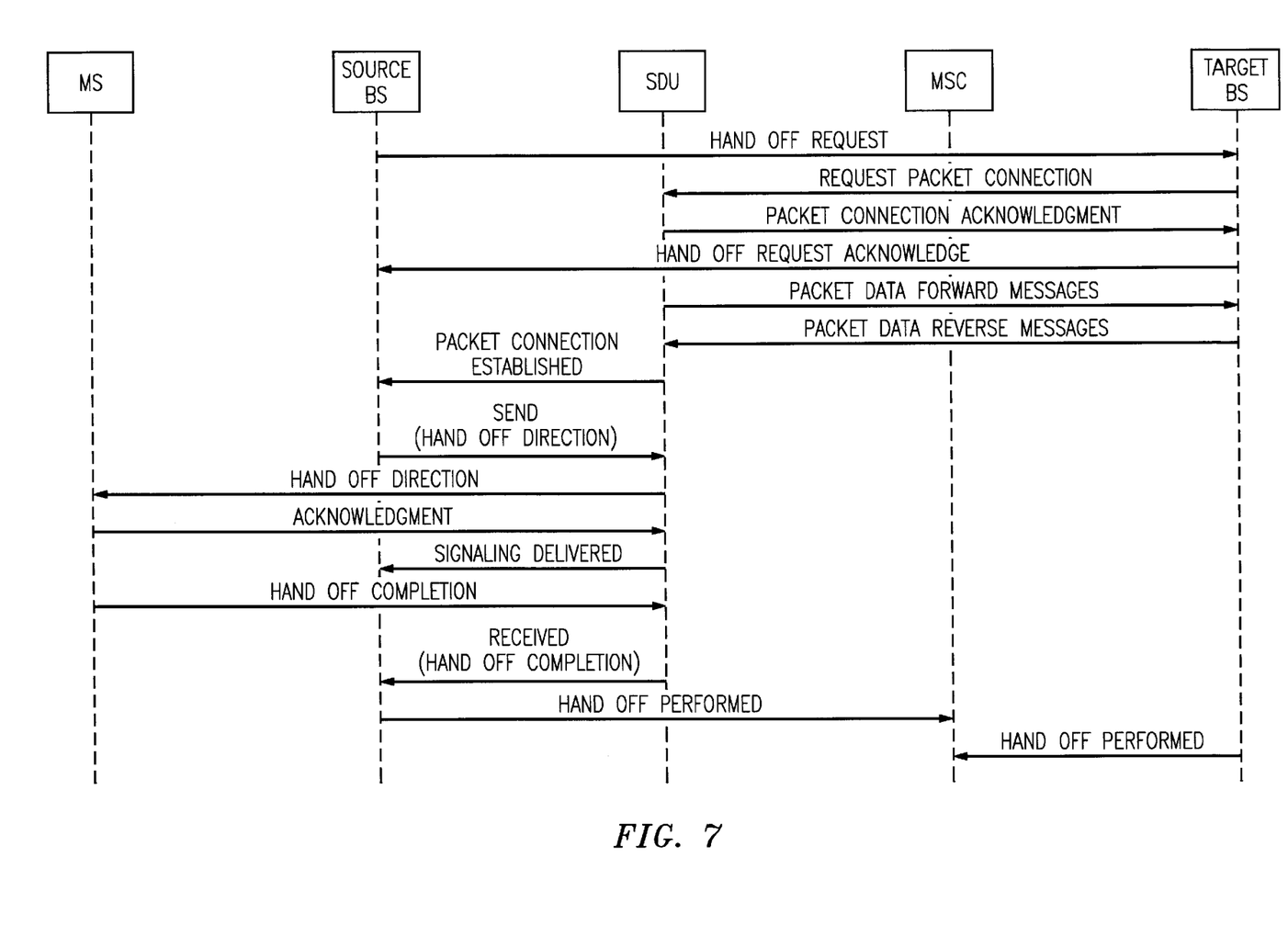
FIG. 7 is a message flow diagram of inter-base station communications for soft handoff support as performed in the wireless telecommunications system of FIG. 3.

FIG. 7 is a message flow diagram outlining the messages exchanged among base stations during soft handoff add target procedures. "Soft handoff add target" refers to the process in which additional base stations become involved in the connection to the mobile station without disruption to the voice link. A traditional soft handoff scenario requires base stations participating in the handoff to exchange required control data. These control messages are passed between the base stations via the MSC. The latency introduced due to this procedure often does not meet the stringent timing requirements for successful soft handoff in a wireless telecommunications system. FIG. 7 illustrates direct base station to base station communications designed to improve the timing for the exchange of data and thus, allow for consistently successful soft handoffs. For purposes of example, assume that the messages described below are exchanged within wireless telecommunication system 300 as shown in FIG. 3. For clarity, first base station 320 will be referred to as the "source" base station indicating that it is the base station which currently has control of a call to which second base station 340 (also referred to as the "target" base station) is to be added. In accordance with the preferred embodiment, source base station 320 determines that a handoff is required and issues a handoff request message to target base station 340 via signaling link 305. Target base station 340 determines that it will accept the handoff. Accordingly, interconnection processor 344 in the target base station extends a packet-based connection request to SDU 310 to create signaling and user traffic link 315. SDU 310 completes connection 315 and returns a connection acknowledgment message to target base station 340 indicating that the connection has been established.

Target base station 340 then extends a handoff request acknowledgment message to source base station 320 over signaling link 305. SDU 310 begins to send packetized user traffic messages to target base station 340 across link 315 immediately after the connection acknowledgment message is sent. In turn, the target base station channel element 346 extends forward traffic channel data frames to the mobile station participating in the call which is being handed off. Upon receiving the first forward traffic channel data frame, target base station channel element 346 begins to send reverse idle frames to SDU 310 via interconnection processor 344 over-link 315. Upon determination by SDU 310 that link 315 to base station 340 is appropriately established, the SDU extends a packet-based connected message to source base station 320 via signaling link 321. Subsequently, source base station 320 extends a handoff direction message to the mobile station participating in the call. More particularly, source base station 320 sends a signaling message to SDU 310 containing a handoff direction message. SDU 310 sends the handoff direction message to the mobile station via link 313 which is internally connected to base station channel element 326. The mobile station extends a mobile station acknowledgment order to acknowledge the handoff direction message received. The mobile station acknowledgment order is delivered to SDU 310 via signaling link 313. SDU 310 then informs source base station 320 of successful delivery of the handoff direction message via a data forward signaling delivered message which is sent on signaling link 321.

The mobile station extends a handoff completion message to SDU 310 via links 327/313 and 347/315 after completion of the soft handoff to the target base station. Subsequently, the SDU forwards the handoff completion message to source base station 320 via signaling link 321 and source base station 320 extends a handoff performed message to MSC 302 via signaling link 301 to inform it that the mobile station's active location has been changed.

The introduction of the first and second interconnection protocols enables several types of call handoffs in a wireless telecommunications system as the mobile station moves from one base station to another. More particularly, the various types of handoff which occur include hard handoff, semi-soft handoff, soft handoff and soft handoff with consolidation. In the preferred embodiment, when a target base station receives a request from a source base station indicating that a handoff of a call is requested, the target base station determines which resources are available for the call. For example, the source base station may request a soft handoff but the target base station may only have resources for a hard handoff. This resource data is conveyed to the source base station so that agreement of the handoff type is reached before the handoff procedure is commenced.

Figure 8:
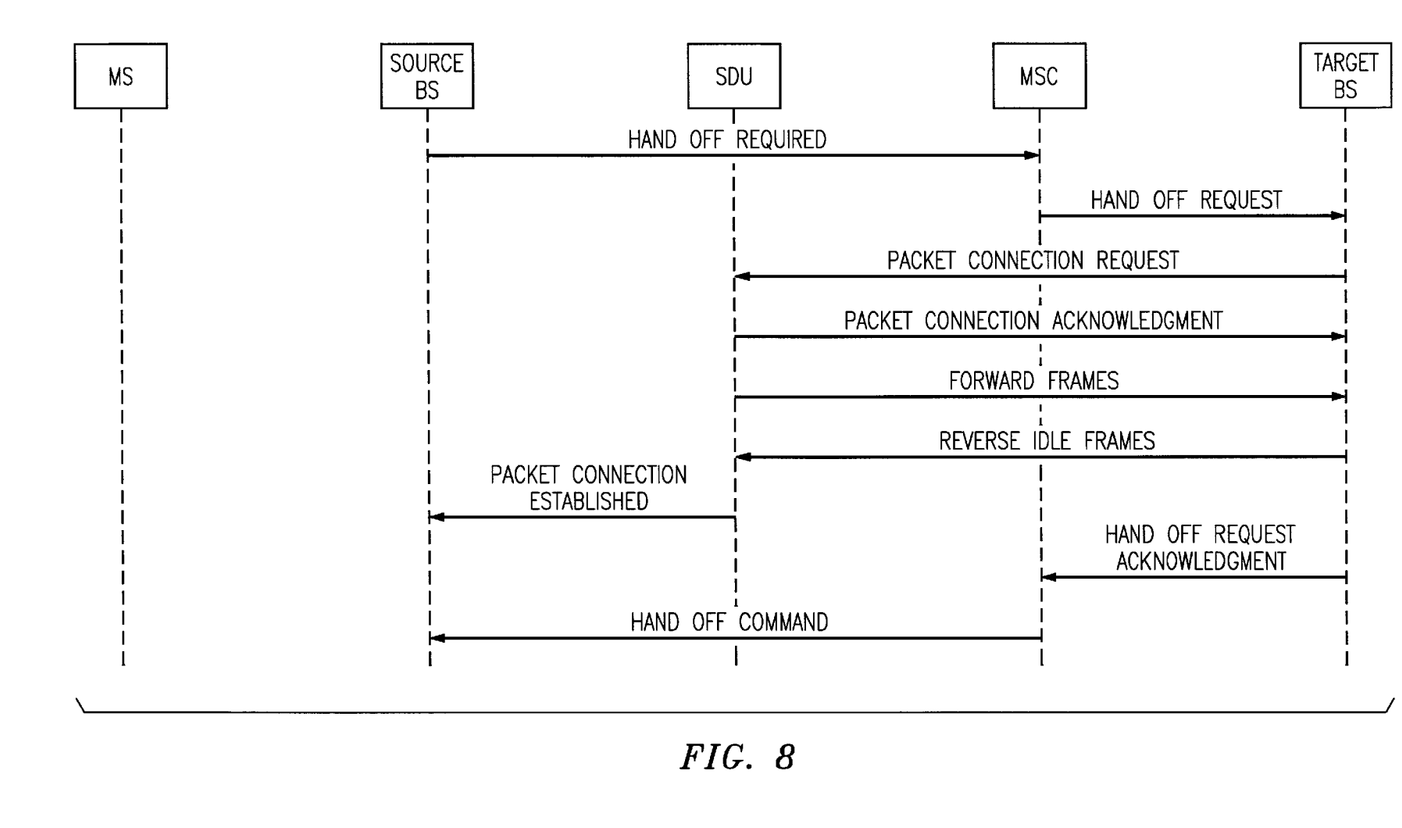
FIG. 8 is a message flow diagram of handoff type selection by a target base station as performed in the wireless telecommunications system of FIG. 3.

FIG. 8 is a message flow diagram depicting the messages exchanged in wireless telecommunications system 300 for determining handoff type selection by a target base station. In the preferred embodiment, the source base station may allow one or more handoff type options which are conveyed to the target base station. This particular embodiment supports both a mandated handoff type (i.e., the source base station allows only one handoff) or multiple handoff types. Advantageously, there is a reduction in the number of messages exchanged during a handoff scenario due to an increased efficiency in the handoff execution as a result of the handoff type selection process. Further, all the handoff messages including the list of allowed handoff types can be circulated through the MSC across signaling links 301 and 303, thereby also allowing the MSC to exercise control of the handoff types allowed.

For purposes of example, assume that control of mobile station 360, currently served by source base station 320, requires a handoff. The handoff type selection process begins when call controller 322 of source base station 320 extends a handoff required message to MSC 302 via signaling link 301. MSC 302 receives the handoff required message and extends a handoff request message to call controller 342 of target base station 340 over signaling link 303. The handoff request message includes a list of allowed handoff types as formulated by call controller 322 of the source base station.

Target base station 340 determines which, if any, of the handoff type options it will select to process this call. If the target base station determines that it may accommodate the requested handoff, interconnection processor 344 extends a connect message to the SDU to establish user traffic and signaling link 315. SDU 310 responds to the connect message by establishing signaling link 315 to interconnection processor 344 of the target base station. Next, the target base station remains idle while waiting to receive forward traffic channel frames from the source base station. As soon as the first forward traffic channel data frame is received in target base station channel element 346, channel element 346 begins to send reverse idle frames to SDU 310 via links 315 and 347. Upon receipt of the idle frames, SDU 310 determines if the connection between the mobile station and channel element 346 of the target base station has been appropriately established and SDU 310 extends a packet connection established message to source base station 320 via signaling link 313. In addition, target base station call controller 342 extends a handoff request acknowledgment message to MSC 302 via signaling link 303. MSC 302 then extends a handoff command message to source base station call controller 322 so that the handoff can be completed.

Another common occurrence in wireless telecommunications systems is referred to as "glare". A glare situation occurs when a user attempts to make a call at the same time that another party is attempting to call the same user. Traditionally, wireless telecommunications systems have been unable to accommodate call glare. In other words, the mobile originated call is serviced by default. With the establishment of the first and second interconnection protocols, a call glare situation is detectable by both the MSC and the mobile station. However, it is the responsibility of the MSC to resolve the situation by allowing only one call to be connected. More particularly, when the mobile station has initiated a call and the MSC has elected to reject the initiated call and instead deliver the incoming call to the mobile station, the MSC must transmit this information to the serving base station so that activities in the network may be synchronized. The base station must signal its acceptance of the delivery of the incoming call. In some embodiments, the base station may reject delivery of the incoming call in which case the MSC must proceed to service the call originated by the mobile user.

Figure 9:
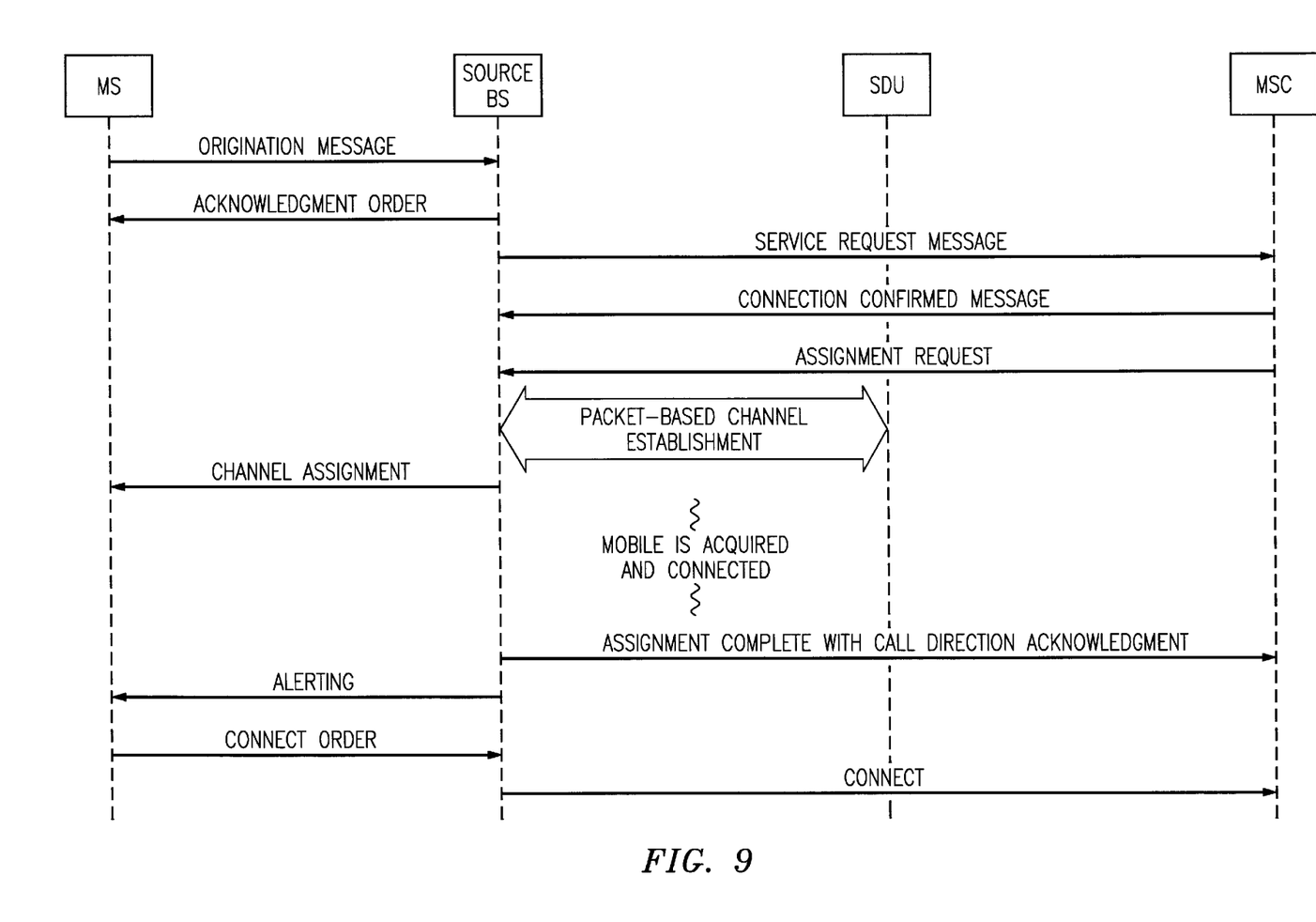
FIG. 9 is a message flow diagram addressing call glare as performed in the wireless telecommunications system of FIG. 3.

FIG. 9 describes how signaling between the MSC and a base station can be used to synchronize the network to a new call direction in glare situations (that is, how to allow a mobile initiated call to be interrupted for delivery of a call to the mobile). For purposes of example, assume that the messages described in message flow diagram FIG. 9 are exchanged within wireless telecommunications system 300 as shown in FIG. 3. The process begins when mobile station 360 transmits an origination message over an air interface to its serving base station (in this example, first base station 320). Base station 320 acknowledges receipt of the origination message with a base station acknowledgment order which is delivered to the mobile station. Subsequently, base station 320 extends a service request message to MSC 302 to create signaling link 301 and to forward the origination request. MSC 302 responds to base station 320 with a connection confirmation message indicating establishment of link 301. In this embodiment, the service request message includes mobile identity information such as its electronic serial number. MSC 302 then extends an assignment request message to base station 320 requesting that the base station allocate radio resources for the call. The assignment request message includes a call direction element indicating the MSC's desire to change the direction of the call from mobile originated to mobile terminated. In this embodiment, functions performed by SDU 310 are separated from the base station so MSC 302 identifies SDU 310 in its assignment request message. Upon receipt of the assignment request message, base station 320 initiates the packet-based channel establishment procedure as described in FIG. 5. Next, base station 320 sends a channel assignment message over the control channel of the radio interface to initiate an establishment of a radio traffic channel to the mobile station. The mobile station and network then exchange necessary messages to acquire the mobile station and properly connect it.

After the radio traffic channel and packet mode channel have been established, base station 320 extends an assignment complete message to MSC 302 and indicates its acceptance of the call direction change by including a call direction acknowledgment element. Base station 320 then extends an alerting message to the mobile station to cause ringing at the station via established links. When the call is answered, a connect order is transmitted to base station 320. Base station 320 then extends a connect message to MSC 302 indicating that the call has been answered at the mobile station and is in a conversation state.

Figure 10:
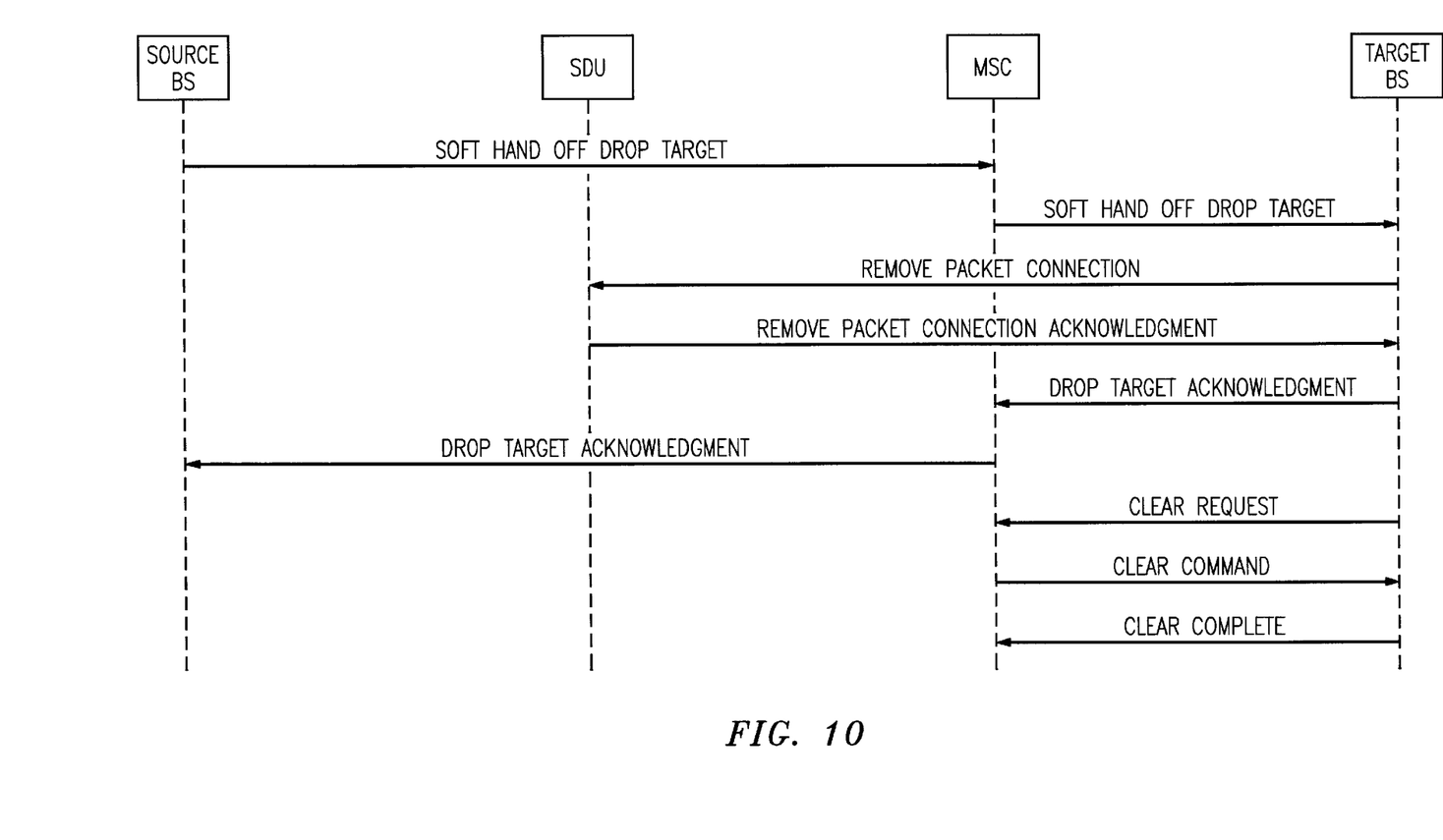
FIG. 10 is a message flow diagram of signaling connection clearing by a target base station as performed in the wireless telecommunications system of FIG. 3.

FIG. 10 is a message flow diagram depicting messages exchanged within wireless telecommunications system 300 to remove unnecessary connections. More particularly, during operation of a call that makes use of a soft handoff, a target base station may be supplying a set of resources to support the call. A signaling connection specific to the call is also created between the MSC and the target base station. Traditionally, when resources at the target base station are no longer required, they must be removed from the call under direction of the MSC. In the preferred embodiment of the present invention, the target base station directly interacts with the MSC to remove such a signaling connection.

For purposes of example, assume that soft handoff has occurred and resources at the target base station are no longer required. Accordingly, source base station 320 extends a soft handoff drop target message to MSC 302 to be forwarded to target base station 340. Target base station 340 removes its packet connection 315 to SDU 310 and sends a soft handoff drop target acknowledgment message to MSC 302 via link 303 to be forwarded to source base station 320. Target base station 340, realizing that it has no more radio resources allocated to the call, sends a clear request message to MSC 302 to request clearing of signaling link 303.

MSC 302 extends a clear command message to the target base station to instruct it to release the associated dedicated resource (that is, signaling link 303). In response to the clear command message, the target base station sends a clear complete message and releases signaling link 303. Note that in alternative embodiments, the soft handoff drop target and soft handoff drop target acknowledgment messages is exchanged via signaling link 305.

Advantageously, the first and second interconnection protocols allow flexibility in MSC/base station communications which enables the above-described network configuration and call processing and control. Although the present invention has been illustrated using preferred embodiments, those skilled in the art may devise other arrangements without departing from the scope of the invention.

What is claimed is:

1. A wireless telecommunications system comprising:

a selection/distribution unit (SDU) interconnected to a first interconnection processor of a first base station via a first interconnection protocol, the first interconnection protocol allowing communication between the SDU and the base station for the transmission of user traffic;

the SDU interconnected to a second interconnection processor of a second base station via the first interconnection protocol;

the SDU interconnected to a first call control processor of the first base station via a second interconnection protocol wherein the second interconnection protocol allows control of the SDU; and the SDU interconnected to a second call control processor of the second base station via the second interconnection protocol.

2. The wireless telecommunications system of claim 1 further comprising base stations which directly communicate with each other over a signaling link.

3. A wireless telecommunications system including a mobile switching center interconnected to a plurality of base stations comprising:

a selection/distribution unit (SDU) located in a first base station interconnected to a call control processor and an interconnection processor in a second base station, wherein a first interconnection protocol allows communication between the SDU and the second base station for the transmission of user traffic and wherein a second interconnection protocol allows communication between the SDU and the second base station for control of the SDU; and the SDU interconnected to a switch fabric positioned in the mobile switching center wherein communication between the mobile switching center and base stations is transmitted via the SDU.

4. A wireless telecommunications system comprising:

an interworking processor interconnected to a mobile switching center via a first user data traffic link and a selection/distribution unit (SDU) via a second user data traffic link;

the SDU interconnected to an interconnection processor of a least one base station via a first interconnection protocol, the first interconnection protocol allowing communication between the SDU and the base station for the transmission of user traffic; and the SDU interconnected to a call control processor of at least one base station via a second interconnection protocol for control of the SDU.

5. The wireless telecommunications system of claim 4 wherein the SDU is accessed by a plurality of base stations.

* * * * *